UNITED STATES PATENT OFFICE.

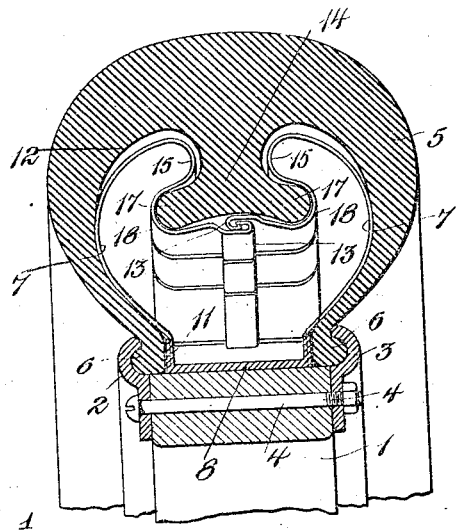

MICHELE SCROCCO, OF NEW YORK, N. Y.

VEHICLE-TIRE.

1,285,419.　　　　　Specification of Letters Patent.　　Patented Nov. 19, 1918.

Application filed January 30, 1918. Serial No. 214,458.

*To all whom it may concern:*

Be it known that I, MICHELE SCROCCO, a subject of the King of Italy, (first naturalization papers having been obtained,) and a resident of the city of New York, Long Island City, borough of Queens, in the county of Queens and State of New York, have invented a new and Improved Vehicle-Tire, of which the following is a full, clear, and exact description.

This invention relates to a vehicle tire of that type embodying a plurality of spring members within a rubber or other case in order to take the place of the ordinary pneumatic tube, so as to do away with punctures, blow-outs and other objectionable features.

The invention has for its general objects to improve and simplify the construction of vehicle tires so as to be reliable and efficient in use, comparatively simple and inexpensive to manufacture, and so designed as to be used in connection with ordinary wheels without any change in the construction thereof.

A more specific object of the invention is the provision of a spring device of novel construction adapted to be arranged within the rubber shoe or case of a tire, whereby the spring device provides the desired resiliency to insure easy and smooth running of the vehicle.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a transverse section of a vehicle tire; taken on the line 1—1, Fig. 2;

Fig. 2 is a fragmentary side view with a portion in section;

Fig. 3 is an enlarged sectional view on the line 3—3, Fig. 4;

Fig. 4 is a detail sectional view on the line 4—4, Fig. 2;

Fig. 5 is a perspective view of one of the spring elements; and

Fig. 6 is a side view of the vehicle wheel.

Referring to the drawing, 1 designates the felly of a wheel which has tire clamp rings 2 and 3 fastened to opposite sides thereof by bolts or equivalent means 4. The tire embodies a rubber shoe or case 5 which is provided with the usual beads 6 that are engaged by the rings 2 and 3.

Within the case 5 is a spring cushioning device which is composed of oppositely disposed sets of spring elements 7 attached to a band or base 8 of channel-shaped cross section which lies between the beaded edges of the case 5, and the spring elements 7 are shaped to fit the internal wall of the tire case or shoe. The base portion 9 of each spring element 7 may be dove-tailed, as shown in Fig. 3, so as to engage in dove-tail recesses 10 in the upstanding flanges 11 of the base ring 8 of the spring device. The outer ends 12 of the spring elements 7 are each formed into a compound curve, and the end edges of two oppositely disposed spring elements 7 are bent into interlocking flanges or hooks 13, as clearly shown in Fig. 1, so as to limit the lateral or outward movement of oppositely disposed spring elements when a radial compression pressure is brought to bear upon the tire. The inner surface of the tire case is provided with an annular ridge or web 14 which lies between the bends 15 of the two sets of spring elements, and this web has lateral annular flanges 17 which engage in the portions 18 of the S-shaped curved extremities. In this manner the case and spring elements are effectively held in proper relation, while at the same time allowing of freedom of movement in the compression and expansion of the tire.

The cushioning device is a unitary structure which fits within the tire case and is effectively held in place on the wheel felly by the clamping of the tire case thereto. To obtain the desired resiliency of the members 7 their side edges are cut away at 19, Fig. 2, so that the tire case will yield sufficiently under a load.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a wheel felly, a tire case, means on the felly for clamping the case thereto, a channel-shaped member disposed around the felly, a set of radially disposed resilient elements on each side of the said member, each resilient element having an outer extremity bent inwardly and laterally, and means for movably interlocking the free extremities of oppositely disposed resilient elements for limiting the lateral spreading under compression of the tire case.

2. The combination of a wheel felly, a tire case, means on the felly for clamping the case thereto, a channel-shaped member disposed around the felly, a set of radially disposed resilient elements on each side of the said member, each resilient element having an outer extremity bent inwardly and laterally, means for movably interlocking the free extremities of oppositely-disposed resilient elements for limiting the lateral spreading under compression of the tire case, and an internal web on the tire case fitting between the inwardly bent ends of the two sets of resilient elements.

3. The combination of a wheel felly, a tire case, means for clamping the case to the felly, a cushioning device in the case composed of two oppositely disposed sets of spring elements having compound curved outer ends, and an internal web on the case having lateral flanges engaging between the curved ends of the two sets of spring elements, the outer ends of oppositely disposed spring elements being movably connected.

4. A cushioning device for a tire case, comprising a base member having side flanges, sets of oppositely disposed curved resilient elements detachably connected with the flanges and having their ends movably connected for preventing the resilient elements from spreading laterally.

MICHELE SCROCCO.

Copies of this patent may be obtained for five cents each, by addressing the "Commissioner of Patents, Washington, D. C."